Figure 1:
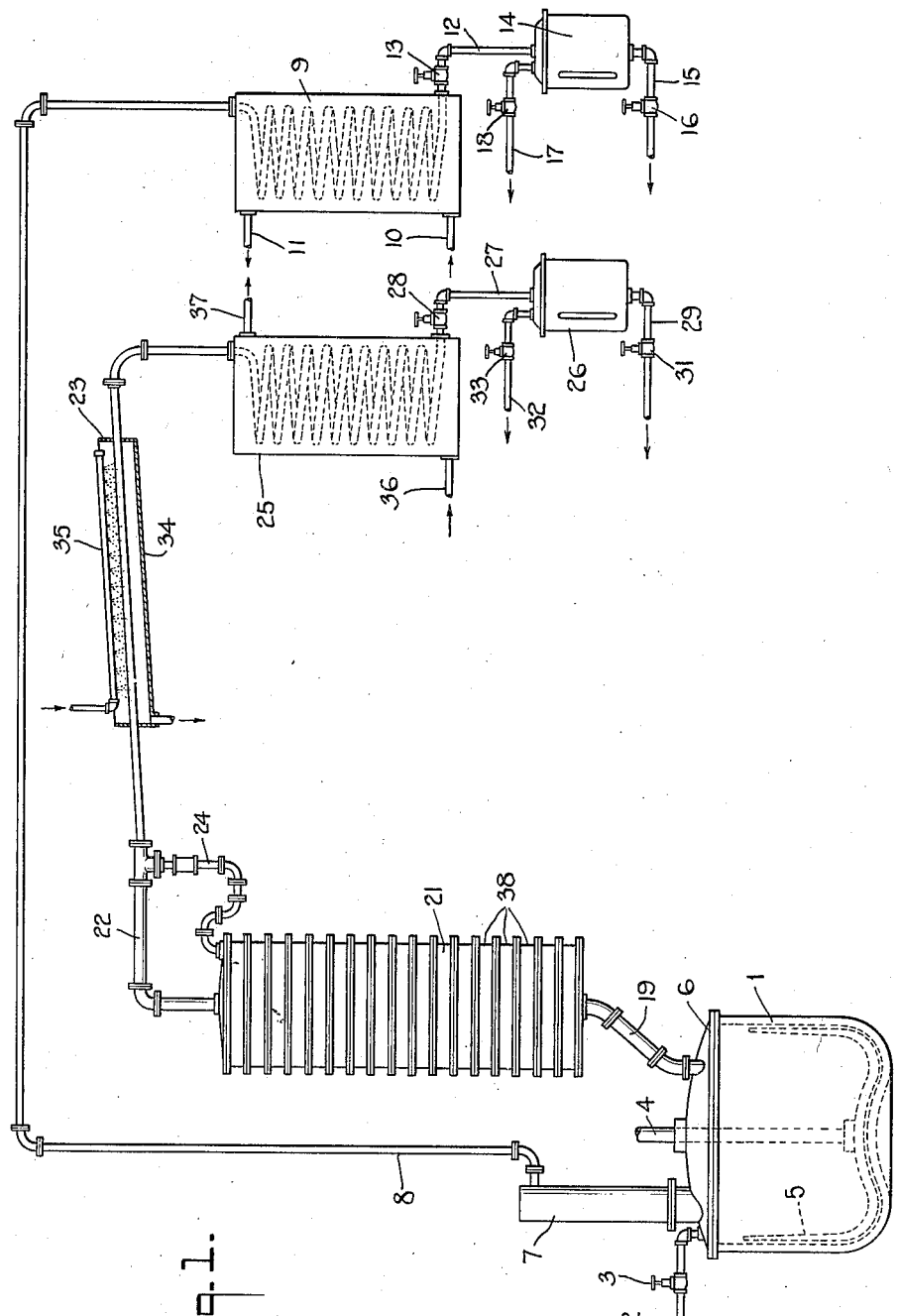

Jan. 28, 1941.   C. I. HANEY   2,230,112
METHOD OF PURIFYING AN ALIPHATIC ANHYDRIDE
Filed June 30, 1937   2 Sheets-Sheet 1

INVENTOR
Clifford I. Haney
BY
ATTORNEYS

Jan. 28, 1941.                C. I. HANEY                2,230,112
              METHOD OF PURIFYING AN ALIPHATIC ANHYDRIDE
                  Filed June 30, 1937        2 Sheets-Sheet 2
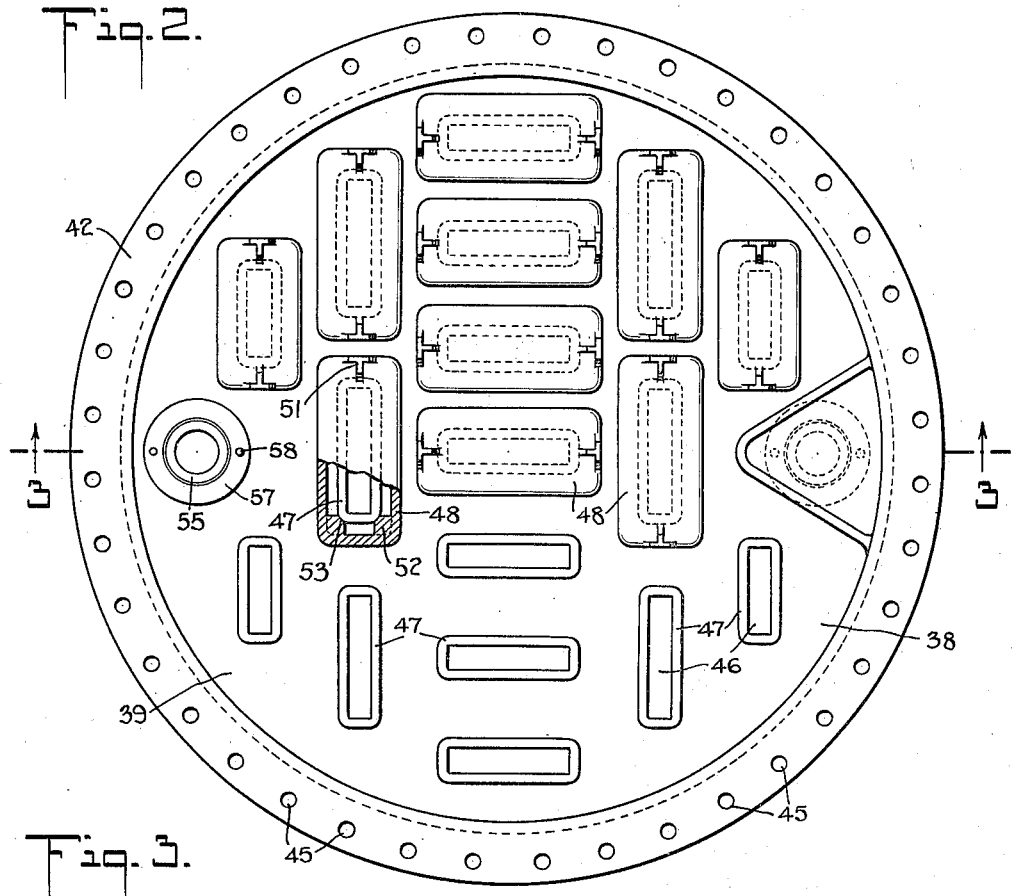
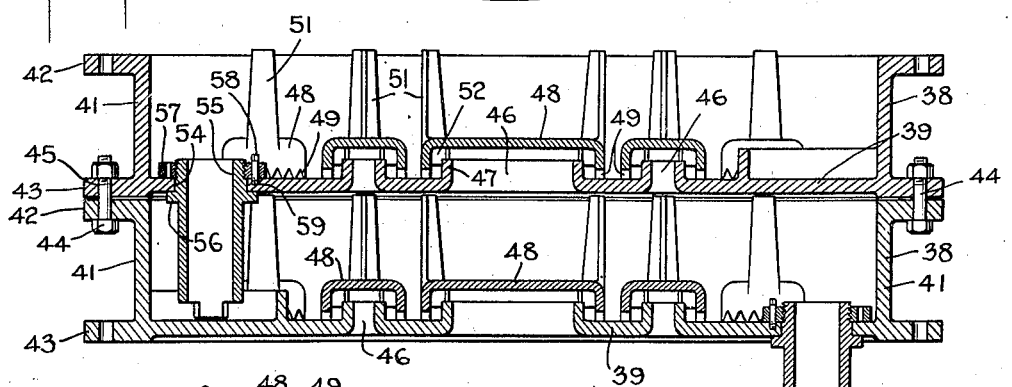
INVENTOR
Clifford I. Haney
BY
ATTORNEYS Patented Jan. 28, 1941

2,230,112

UNITED STATES PATENT OFFICE 2,230,112

METHOD OF PURIFYING AN ALIPHATIC ANHYDRIDE

Clifford I. Haney, Drummondville, Quebec, Canada, assignor to Celanese Corporation of America, a corporation of Delaware Application June 30, 1937, Serial No. 151,191

7 Claims. (Cl. 260—548)

This invention relates to a method for the purification of the anhydrides of aliphatic acids, especially acetic anhydride, wherein the anhydride is produced in conjunction with or in contact with compounds containing sulphur.

An object of the invention is the economic production of anhydrides of aliphatic acids that are substantially free of sulphur or compounds containing sulphur. Another object of the invention is the construction of a device for the fractional distillation of an anhydride wherein substantially all the metal contacted by the anhydride is cast iron. Other objects of the invention will appear from the following detailed description and drawings.

In the drawings, wherein like reference numerals refer to the same or similar elements in the respective views:

Fig. 1 is an elevational view of a device constructed in accordance with this invention and particularly adapted for carrying out the process of this invention, Fig. 2 is a plan view of a section of the fractionating column shown in Fig. 1, Fig. 3 is a cross-sectional view taken on line 3—3 of Fig. 2, and Fig. 4 is a perspective view of a bubble cap used in the fractionating column.

The anhydrides to be used in the esterification of cellulose and some other uses must be free of metal salts and sulphur or compounds containing sulphur. Even the presence of very small amounts of iron and copper salts in the anhydride produces undesirable color and haze in the cellulose ester. When sulphur or labile sulphur compounds are present in the anhydride, they attack various metals during the cellulose acetate manufacturting process and also, being picked up by the cellulose acetate, cause corrosion of plant used to make finished articles therefrom. The presence of these various metallic and sulphur compounds may also be detrimental to the finished article. The presence of sulphur and labile sulphur compounds in the anhydride produces unstable cellulose esters unless the same are given long and expensive treatments to remove and/or convert the sulphur or sulphur compounds into ineffective compounds.

In accordance with this invention, the still-pot, fractionating column and pipe lines are formed in such a manner that riveting, welding and the introduction of wrought iron are eliminated. This results in a greatly prolonged life for the apparatus and prevents the anhydride from taking up any undesired metal compound. The construction of the fractionating column is such that it is easily taken down, cleaned and reassembled. Also, in accordance with this invention, I produce an anhydride and purify the same by a process in which the portions of the anhydride distilling over first and last, which portions are rich in sulphur or compounds containing sulphur, are separated from the bulk of anhydride and passed through a separate part of the device such that they will not contaminate that part of the device through which is passed the main portion or bulk of the anhydride.

This invention is applicable to the production of aliphatic acid anhydrides formed by any method where they contact materials containing sulphur. It is not necessary that the materials containing sulphur form a part of the reaction so long as they are contacted by the anhydride, as the anhydride has the property of dissolving an appreciable amount of sulphur and many sulphur-containing compounds. The invention is particularly applicable to the production of aliphatic acid anhydrides by the sulphur halide method, such as the production of acetic anhydride by the reaction of sodium acetate with sulphur dichloride. By aliphatic acid anhydrides is meant acetic anhydride, propionic anhydride, butyric anhydride, iso-butyric anhydride and similar anhydrides.

I have found that while the vapor pressure of sulphur is very small, it acts somewhat as a liquid under the conditions existing in the distillation of an anhydride. I have found that a considerable improvement in the anhydride is obtained by fractionally distilling the anhydride under reflux. For instance, acetic anhydride containing 50 to 60 or more parts per million of sulphur dissolved therein after fractional distillation contains but 1 to 20 parts per million of sulphur. Although this is a big improvement and has reduced the sulphur content to such an amount that cellulose derivatives made with same are capable of commercial stabilization by treatment of the cellulose derivative by methods well known in the art, by the process of my invention this sulphur content is still further reduced.

During the preliminary purification of anhydride with chlorine and sodium acetate, one can get rid of the sulphur compounds fairly easily, but cannot use up the excess elemental sulphur that comes forward in the crude anhydride. When anhydride is made from sulphur, chlorine and sodium acetate, it is necessary to use 50 to 100% more sulphur than the theoretical to get a complete reaction, hence it is not surprising to find that one cannot fix the small amount of free sulphur that is present in the crude anhydride with chlorine, as above described in purifying. While the fractionating column does throw back some of the combined sulphur compounds, and makes purification of the anhydride easier, the main use of the column is to fractionate out this elemental sulphur that does not combine with anything in the preliminary purification.

I have found that the first portion of the anhydride distillate going through the fractionating column is relatively high in sulphur and, therefore, I separate this portion from the remainder of the anhydride distillate. As the distillation nears the end point, the residue in the still is high in sulphur and so is the distillate. I therefore also separate the last portion of the distillate from the remainder thereof. The first portion of distillate and the last portion of the distillate that is separated from the bulk of the distillate may be returned to the same or to a succeeding batch that is to be distilled. This separation of the distillate takes place as near as possible to the still-pot because the first and last part of the distillate contains a relatively large percentage of sulphur and tends to deposit that sulphur in the various devices through which it passes. It therefore contaminates the fractionating column, pipe lines, etc. to such an extent that the central portion, which comprises the bulk of the anhydride, passing through those lines would have a tendency to pick up the same and carry it forward. I therefore separate the two ends of distillate from the bulk of distillate at the still-pot and pass the said ends of distillate through an apparatus different from that through which the bulk of distillate passes, thereby producing the main portion in such purity that it contains less than 20 parts per million and usually from 2 to 10 parts per million of sulphur and compounds containing sulphur. By employing an anhydride having such a low sulphur content, and all other factors being favorable, a cellulose ester may be produced that is sufficiently stable for commercial use without the necessity of a stabilization treatment.

If desired the first purification of the anhydride with chlorine and sodium acetate to get rid of reactive sulphur compounds may take place in a still-pot and the vapors carried off through a system including a condenser. The condensed vapors are returned to the still-pot until they show negative to a silver nitrate test for sulphur compounds. The vapors are then turned from that system to one including a fractionating column and final condenser for the purified anhydride. At the end of a series of charges, the residue in the still-pot, which is made up essentially of free sulphur, various sodium salts and anhydride, is sucked out of the still by any suitable means or the residue may be dried in the still-pot and the vapors passed to a condenser in a system other than that employed for the bulk of the anhydride.

The amount of anhydride to be separated from the bulk of the anhydride, as the two end portions, naturally varies in accordance with the sulphur content of the impure anhydride introduced in the still-pot. In general practice, I have found that these end portions amount to from 30 to 50 gallons each in a batch of about 500 gallons. The end portions do not need to be fractionated and are, therefore, led directly from the still-pot to a condenser and then to storage. As stated above, they may be withdrawn from storage and added to the succeeding batches of anhydride going to the still-pot or they may first be given a special treatment for removal of a part or all of their sulphur before being returned to the still-pot. The bulk of the anhydride is directed through a fractionating column, refluxed and then to a condenser.

Although I prefer to use a device as shown in the drawings for carrying out the fractionation of the anhydride, other devices may be employed. The device shown in the drawings and forming a part of this invention comprises a fractionating column particularly adapted to the process of this invention. In Fig. 1 of the drawings there is shown a still-pot 1 which may be jacketed or provided with other means for raising the temperature of the same to above the boiling temperature of the anhydride being distilled. A feed line 2 with a control valve 3 is provided for charging the still-pot with the anhydride. The still-pot is also provided with a shaft 4 carrying blades 5 for the purpose of stirring the contents of the still-pot. The shaft 4 may be driven by any suitable means not shown. The still-pot is also provided with a lid 6 which may be removed or may be provided with a manhole for the purpose of cleaning the still-pot.

In the lid 6 of the still-pot is a dust collector 7 from which a pipe 8 runs to a condenser 9. The condenser 9 may be cooled by suitable liquid circulating therethrough introduced and withdrawn by means of pipes 10 and 11, respectively. From the condenser 9 the anhydride is drawn through a pipe 12 controlled by valve 13 to a flash chamber 14. The anhydride may be withdrawn from the flash chamber 14 through pipe line 15 controlled by the valve 16 while the uncondensed gases may be drawn through the pipe line 17 controlled by valve 18. The dust collector 7, pipe line 8, condenser 9 and flash chamber 14 form a circuit through which the two end portions of the distillate are removed from the system or through which the first portion is circulated back to the still-pot until the sulphur compounds are reduced to an amount that cannot be detected by a silver nitrate test.

The main portion or the bulk of the anhydride is distilled through a fractionating column. In the lid 6 of the still-pot is a pipe line 19 carrying the anhydride vapors to a fractionating column 21. The gases from the fractionating column pass through pipe line 22 to a partial condenser 23. The anhydride condensed at the partial condenser 23 returns to the fractionating column by means of a pipe line 24 while the remaining gases pass into a complete condenser 25. The anhydride condensed in the condenser 25 is carried to a flash chamber 26 by means of pipe line 27 controlled by the valve 28. The purified anhydride may be withdrawn from the flash chamber through pipe line 29 controlled by valve 31, while the uncondensed gases may be withdrawn from the flash chamber through pipe line 32 controlled by valve 33. The adjustment of the valves 13 and 28 will regulate the circuit taken by the distillate from the still-pot. The partial condenser 23 may consist of an open tank 34 above which is a pipe 35 adapted to spray water upon the pipe line 22 effecting a partial condensation of the anhydride. The condenser 25 may be of any suitable type such as a coil about which circulates a cooling liquid fed by pipe 36 and discharged through pipe 37. Vacuum is created in the flash chambers 14 and 26 through lines 17 and 32 and suitable vacuum pumps.

The fractionating column employed in accordance with this invention is preferably one that can be easily cleaned of sludge or other deposit of compounds containing impurities and one that is made entirely of cast iron. Such a fractionating column is generally shown at 21 in Fig. 1, and in greater detail in Figs. 2, 3 and 4. The fractionating column consists of a series of trays 38, each of which comprises a perforated bottom 39 and side walls 41. These side walls terminate at top and bottom in outwardly projecting flanges 42 and 43, respectively. The column is completed by bolting together a plurality of these trays by means of bolts 44 received in apertures 45.

The trays contain a plurality of perforations 46 which may be of the same or different sizes and of the same or different shapes. Each of these apertures is surrounded by an upwardly extending flange or rim 47. Over each of the apertures is a cap 48. The bottom part 49 of the cap 48 is saw-toothed, so as to permit the anhydride vapor to rise through the bubble caps and the liquid to flow down sleeve 55. The caps are provided at each end with upstanding legs 51 adapted to help support in spaced relationship the tray mounted immediately above and also to retain the caps in position. Each cap 48 is also provided with shoulders 52 adapted to register with the rim 47. Where the opening is square or rectangle four of said shoulders may be provided in each cap, each shoulder having a cutaway portion 53 adapted to contact the rim 47 to positively position the cap. For carrying the liquid from one tray to the next and for regulating the depth of liquid on each tray there is provided an opening 54 in the tray. Into the opening 54 is placed a sleeve 55 that is held in position by a shoulder 56 adapted to fit under the tray and a collar 57 screwed on the sleeve and fitting on the top of the tray. The collar 57 may be held against rotation by means of a pin 58 fitting in a hole in same and into a threaded well 59 in the tray. The collar 57 controls the height of the mouth of the sleeve 55 which determines the depth of liquid within the runs of each tray.

Obviously the openings or perforations 46 need not be of the same shape in each succeeding tray or in the same tray. Also the saw-toothed arrangement 49 at the bottom of the caps may be replaced for a series of holes or the caps may stand on legs spaced further apart than the saw-toothed arrangement shown. Between the flanges 42 of one tray and 45 of the next tray suitable gaskets or cementing agents may be employed. Also, any number of trays other than that shown may be employed depending upon the general purity of the anhydride and in the particular anhydride being produced. Any other methods of the device as shown and described above may be made so long as there is no introduction into the system of wrought iron, copper alloys, lead, zinc or other compounds generally found in welded, joined, soldered and riveted.

*Example*

12,000 lbs. of anhydride is given a preliminary purification by any suitable method. Portions of it are distilled off through the pipe 8, condenser 9, and tourelle 14, and returned at intervals to the still-pot 1 until it passes the usual tests. Pipe 8 is then blanked off and the fractionating system is started by putting vacuum on tourelle 26 through valve 33, after turning on reflux water spray 35.

Steam pressure on still-pot 1 is_____lbs__ 25
Vacuum used_____inches__ 25–28
Condenser water_____°C__ 20

The temperature in the still-pot depends on the vacuum, say around 80° C. The anhydride is fractionated off at the rate of 1500 to 2000 lbs. an hour, turning back also around 500 lbs. per hour as reflux.

After about five hours when 10,000 to 11,000 lbs. of anhydride have fractionated over, the run ceases of itself, as it takes around 1,500 lbs. of anhydride to work the system. Another charge of 10,000 lbs. of anhydride is added to the still-pot and after preliminary purification, is fractionated off. This time practically all the 10,000 lbs. is recovered as pure product. The product, containing say 2–6 parts per million of sulphur, is 95 to 99% acetic anhydride.

It is to be understood that the foregoing detailed description is merely given by way of illustration and that many variations may be made therein without departing from the spirit of my invention.

Having described my invention, what I desire to secure by Letters Patent is:

1. In a method of purifying a sulfur-containing anhydride of an aliphatic acid, the steps of subjecting the anhydride to a preliminary purification while it is being distilled, condensing the distillate and returning it to the distilling vessel until the amount of sulfur has been reduced to the desired degree, and then fractionating the partially purified anhydride remaining in the still in a different reflux condensing system attached to the same still.

2. In a method of purifying a sulfur-containing acetic anhydride, the steps of subjecting the anhydride to a preliminary purification while it is being distilled, condensing the distillate and returning it to the distilling vessel until the amount of sulfur has been reduced to the desired degree, and then fractionating the partially purified anhydride remaining in the still in a different reflux condensing system attached to the same still.

3. In a method of making an anhydride of an aliphatic acid, the steps of subjecting the anhydried to a preliminary purification, separating the crude anhydride by distillation from a still into first runnings, a middle portion and tailing distillates, and fractionating the middle portion in a reflux condensing system distinct from the condensing system used for removing the first runnings and tailing distillates but attached to the same still, to recover a purified anhydride.

4. In a method of making acetic anhydride, the steps of subjecting the anhydride to a preliminary purification, separating the crude anhydride by distillation from a still into first runnings, a middle portion and tailing distillates, and fractionating the middle portion in a reflux condensing system distinct from the condensing system used for removing the first runnings and tailing distillates but attached to the same still, to recover a purified acetic anhydride.

5. In a method of making an anhydride of an aliphatic acid, the steps of forming the anhydride by a method involving a reaction between sulphuryl chloride and a salt of an aliphatic acid, subjecting the anhydride to preliminary purification, separating the crude anhydride by distillation from a still into first runnings, a middle portion and tailing distillates, and fractionating the middle portion in a reflux condensing system distinct from the condensing system used for removing the first runnings and tailing distillates but attached to the same still, to recover the purified anhydride.

6. In a method of making acetic anhydride, the steps of forming the anhydride by a method involving a reaction between sulphuryl chloride and a salt of acetic acid, subjecting the anhydride to a preliminary purification, separating the crude anhydride by distillation from a still into first runnings, a middle portion and tailing distillates, and fractionating the middle portion in a reflux condensing system distinct from the condensing system used for removing the first runnings but attached to the same still, to recover the purified anhydride.

7. In a method of making acetic anhydride, the steps of forming the anhydride by a method involving a reaction between sulphuryl chloride and a salt of acetic acid, subjecting the anhydride to a preliminary purification, separating the crude anhydride by distillation from a still into first runnings, a middle portion and tailing distillates, and fractionating the middle portion in a reflux condensing system distinct from the condensing system used for removing the first runnings and tailing distillates but attached to the same still, to recover the purified anhydride.

CLIFFORD I. HANEY.